United States Patent [19]

Espinosa-C. et al.

[11] Patent Number: 4,820,552

[45] Date of Patent: Apr. 11, 1989

[54] COATED ZINC, CHEMISTRY AND MANUFACTURING PROCESS

[76] Inventors: José G. Espinosa-C.; Mauricio Fernandez-Garza, Both of Monterrey, Nuevo Leon, Mexico

[21] Appl. No.: 64,810

[22] Filed: Jun. 22, 1987

[51] Int. Cl.⁴ .............................................. B05D 7/00
[52] U.S. Cl. .................................... 427/216; 252/518; 252/520; 428/403; 428/404
[58] Field of Search ....................... 427/216, 219, 220; 428/404, 403; 252/518, 520

[56] References Cited

U.S. PATENT DOCUMENTS 3,389,105  6/1968  Bolger .............................. 428/404 X
4,600,604  7/1986  Siuta ..................................... 427/216

*Primary Examiner*—Michael Lusignan
*Attorney, Agent, or Firm*—Laurence R. Brown; Alfred J. Mangels

[57] ABSTRACT

A process for making coated zinc metal flakes, wherein finely divided zinc metal powder is dispersed and coated, using a high speed disperser, or the like, in the presence of a liquid dispersing and grinding vehicle, liquid or solid surfactants, and liquid or solid metal oxides. The dispersed coated zinc liquid mixture is then ground to flake form in a ball mill, or the like, filtered and dried, if is required in 100% solids, or left in paste form with a solid content as low as 40%. The liquid grinding vehicle may be hydrocarbon solvents, chlorinated solvents, glycols or liquid plasticizers, and may be used either alone or in combination. Another grinding agent, such as sodium or zinc stearate, may be used in the grinding vehicle for imparting leafing properties. Many different surfactants may be used, either along or combined. The coated materials selected among different metal oxides were: aluminum oxide, titanium dioxide, zirconium dioxide, chromium oxide, nickel oxide and silicon dioxide. The final product of this procedure is a zinc metal flake coated with a thin layer of a metal oxide, which may be either leafing or nonleafing, and in dry or paste form.

15 Claims, No Drawings

COATED ZINC, CHEMISTRY AND MANUFACTURING PROCESS

BACKGROUND OF THE INVENTION

Zinc metal in the form or finely divided powders are widely used as metallic pigments in paints and coatings, i.e., in a mixture in a suitable film-forming organic or inorganic vehicle to provide an anticorrosive, surface-coating composition. Examples of such are the so-called zinc rich paints and inorganic zinc-silicate coatings.

The zinc metal powders are commonly made by fusing the zinc metal in a furnace, raising the temperature and maintaining a reducing atmosphere, to sublimate the metal, which is deposited in a cool chamber like finely divided powder. The zinc powder is size classified. The zinc metal used may be high purity zinc, in ingots, or foil scrap zinc metal, depending on the desired final purity. The particle size must be controlled in the range of microns and the zinc, as metal, must be kept as high as 97% purity. Such powders are mixed in the final step of the paint manufacture, for one can compositions, or supplied in separate containers, for two can coatings, to be mixed with the liquid vehicle when the coating is going to be used.

In this invention zinc powders of different particle sizes were used to be dispersed, coated and wet milled for the preparation of coated zinc flakes with improved anticorrosive properties when used as pigment in paints and coatings During the process of manufacture of the zinc powders, particle size control is critical and difficult to achieve. When the zinc sublimate cools, some micron sized agglomerates are formed, and commonly they are not properly dispersed in the paint preparation. During the storage of the zinc powders more agglomerates are formed if the necessary precautions are not followed. The uncoated zinc powder surface is very sensitive to attack by many chemicals and humidity, forming undesirable soluble salts and agglomerates.

In this invention, the zinc metal powder is first dispersed, giving a more uniform product in particle size. After that the zinc metal particles are coated with very thin layers of metal oxides, which are more resistant to chemical attack and not sensitive to humidity. The coating acts also to protect the metal during grinding, avoiding the cold welding of the particles, and forming more uniformly sized flakes. The metal oxide films are very thin and chemically attached to the surface of the zinc flakes, remaining on the particles after grinding. The film thickness of metal oxide must be controlled to protect the zinc flakes from chemical attack during the paint manufacturing process and to not affect the anticorrosive properties of the zinc metal.

When the paint containing coated zinc flakes is applied over a steel surface, the flakes overlap each other forming a continuous film, giving very good anticorrosive protection to the steel. In some paints, coated zinc flakes with leafing properties may be used to obtain some other desirable properties.

An object of the present invention is to provide a procedure for making coated zinc flakes.

Another object is to provide new and improved zinc flakes coated with chemically resistant metal oxides. In comparison against powders, the coated zinc flakes are more uniform in particle size, the zinc surface is protected against chemical degradation, and the anticorrosive protection of the zinc metal is improved since they form a more continuous film when they are applied like a paint.

In a broad sense, this invention, contemplates the use of metal oxides to coat zinc metal flakes. Among the metal oxides, were selected those which are chemically more resistant, easy to obtain, easy to process and lower in cost.

Aluminum oxide ($Al_2O_3$), titanium dioxide ($TiO_2$), zirconium dioxide ($ZrO_2$), chromium oxide ($Cr_2O_3$), nickel oxide ($Ni_2O_3$), and silicon dioxide ($SiO_2$), were used to coat the zinc metal flakes. The amount of the metal oxides used varies depending on the desired thickness of the layer deposited on the zinc flake surface. Amounts in the range of 1.0% up to about 20.0% by weight, based on the weight of the zinc metal powder, were used.

The method of processing the zinc metal was a wet-dispersion and wet-milling operation, i.e., the feed of zinc metal powder and metal oxide to a liquid wet-milling vehicle, commonly an organic liquid, such as a low evaporation solvent. Suitable liquids used as wet-milling vehicles are those conventionally employed and very well known in the art for wet-milling flake metal powders.

The proportion of grinding liquid vehicles, while not critical, may vary in accordance with the milling conditions employed. The liquid vehicles were selected among those with lower vapor pressure, higher flash points, higher distillation ranges, non-toxic, and with lesser explosion hazards in the grinding operation.

During the zinc metal powder dispersion, the wetting properties of the liquid vehicle has a decisive influence in its selection. In the same way, the polarity of the liquid vehicle is decisive in the selection of the surfactant employed.

Aliphatic and aromatic hydrocarbon solvents (mineral spirits, Solvesso 100, xylene) chlorinated solvents (trichloreothylene), glycols (propylene glycol), plasticizers (DOP) and others (methyl-pyrrolidone) were used as liquid grinding vehicles.

The surfactants (tensioactive materials) were used to help in the dispersion of the zinc metal powder. Those were selected according the manufacturer suggestions and taking in account the polarity of the materials used. The amount of the surfactant varies based on the weight of the zinc metal. The surfactants were added to the liquid grinding vehicle before the zinc metal powder and the metal oxides. The method of the invention comprises wet grinding finely divided zinc metal to flake form in the presence of different metal oxides. The grinding procedure may be performed after dispersing the zinc metal powder in a liquid vehicle, in a ball mill or the like, i.e., in equipment as presently used for grinding flake metal powders and operated in a conventional manner. In other words, except for the use of metal oxides as part of the grinding agent for the zinc metal, the grinding operation and subsequent treatments of filtration and drying of the product may be carried out in essentially the same manner, and with the same techniques and equipment, as in methods heretofore employed for making metal flakes.

The final product of the described method is a zinc metal flake having a surface coating of metal oxides which protect the zinc metal and improve its anticorrosive properties when is used as pigment in the preparation of paints and coatings. A leafing product may be obtained by the use of supplemental grinding agents such as sodium or zinc stearates. The final product can be made 100% solid in a dry form, or a paste with as low as 40% solids. Further features and advantages of the invention will be apparent from the following specific example of production of zinc metal flakes in accordance with the present method.

EXAMPLE 250.0 gr. of zinc, 220 gr. of benzene trichloride, and 330.0 gr., of diethylene glycol are charged in a ball mill and ground together until the particle size of the zinc is the appropriate one. Afterwards, 125.0 gr. of colloidal silica with 40% solids, is added.

Additional grinding is necessary to have the zinc coated. 25.0 gr. of stearic acid is added and grinding is done again. Finally, the product is discharged from the mill and dried. The resultant product is a zinc flake coated with silica.

We claim:

1. A process of making zinc metal flakes coated with metal oxides, comprising
   (a) providing zinc in particulate form;
   (b) dispersing the zinc particles in a liquid vehicle to provide a zinc particle dispersion;
   (c) adding a coating material to the zinc particle dispersion;
   (d) dispersing the coating material in the zinc particle dispersion to provide a dispersion of coated zinc particles; and
   (e) drying the dispersion of coated zinc particles to a desired consistency.

2. A process according to claim 1 wherein silicon dioxide is the coating material.

3. A process according to claim 1 wherein aluminum oxide is the coating material.

4. A process according to claim 1 wherein titanium dioxide is the coating material.

5. A process according to claim1 wherein zirconium dioxide is the coating material.

6. A process according to claim1 wherein chromium dioxide is the coating material.

7. A process according to claim 1 wherein nickel oxide is the coating material.

8. A process according to claim 1 including the step of adding zinc stearate and milling the coated zinc particles in the presence of aluminum oxide particles to make zinc metal flakes coated with aluminum oxide with leafing properties.

9. A process according to claim 1 wherein the zinc particles have a size of less than about 25 microns.

10. A process according to claim 1 wherein the zinc particles have a size of less than about 10 microns.

11. A process according to claim 1 wherein the liquid vehicle is selected from the group consisting of hydrocarbon solvents, oxygenated solvents, chlorinated solvents, glycols, and mixtures thereof.

12. A process according to claim 1 wherein the coating material is selected from the group consisting of the oxides and the insoluble phosphates of nickel, molybdenum, lead, aluminum, titanium, cerium, zirconium, silicon, and mixtures thereof.

13. A process according to claim 1 including the steps of adding a surfactant to the liquid vehicle and milling the dispersion of coated zinc particles in the presence of the surfactant.

14. A process according to claim 13 wherein the surfactant is selected from the group consisting of fatty acids, fatty alcohols, polyalcohols, and mixtures thereof.

15. A process according to claim 1 wherein the coating material has a size of less than about 10 microns.

* * * * *